United States Patent [19]
Frerichs

[11] Patent Number: 5,716,064
[45] Date of Patent: Feb. 10, 1998

[54] TRUCK BED PULL OUT STEP SYSTEM

[76] Inventor: Stephen A. Frerichs, 901 Crested Butte, Hewitt, Tex. 76643

[21] Appl. No.: 770,567

[22] Filed: Dec. 19, 1996

[51] Int. Cl.[6] .................................................. B60R 3/00
[52] U.S. Cl. ........................... 280/166; 280/164.1
[58] Field of Search ........................ 280/166, 163, 280/164.1; D12/203; 296/62

[56] References Cited

U.S. PATENT DOCUMENTS 4,108,458  8/1978  Owens ................................. 280/166

Primary Examiner—Brian L. Johnson
Assistant Examiner—Jonathan E. Butts

[57] ABSTRACT

A truck bed pull out step system installed under the front of a passenger pickup truck bed on one or both sides gives the user the ability to enter the pickup bed area or retrieve items with ease. When not in use is concealed under pickup bed.

1 Claim, 2 Drawing Sheets

TRUCK BED PULL OUT STEP SYSTEM

BACKGROUND OF THE INVENTION

Passenger pickup trucks or used in many ways, for pulling trailers to utility applications. Access to the pickup bed area has always been limited to the use of the rear bumper. Many times because of a trailer that is hooked to a pickup makes the rear bumper not accessible or is inconvenient to use.

The pull out step system is installed near the front of the pickup bed using the rear axle front spring hanger and spring hanger bolt for mounting and can be mounted on one or both sides. When not in use the pull out step system can be pushed in a closed position and is secured with a push button latch. When in a closed position it is concealed under pickup bed.

The pull out step system is fabricated in a way as to give nice appeal making it attractive.

There is a need for the pull out step system which is rugged and can support substantial weight, yet is simple in design, comprises a minimal number of pieces, and is consequently simple to install.

SUMMARY OF THE INVENTION

The pull out step system consists of two parts, one is stationary which is the mounting bracket. The other is movable which is the step.

The stationary mounting bracket is made universal so that it fits any full size passenger pickup truck. The mounting bracket mounts onto the rear axle front spring hanger using the bolt that secures the spring to the hanger. The mounting bracket is secured on the outside of the spring hanger. Once secured the mounting bracket also has an adjustable bolt that acts as an leverage support. This adjustable bolt is screwed in an upward direction until it wedges against the bottom of the end of the said spring. Once adjustable bolt is wedged then a lock nut is screwed upward until tight providing a locked position for the adjustable bolt.

The movable step is possible by using square tubing that telescopes through a piece of larger square tubing. The larger square tube is part of the stationary bracket. A clevis pin is placed at the end of the smaller tube so when in an out position acts as a stop. And secured with a push button latch when in a closed position.

BRIEF DESCRIPTION OF THE DRAWINGS

The invention is described in more detail hereinafter with reference to the accompanying drawings, wherein like reference characters refer to the same part throughout the several views and in which.

DETAIL DESCRIPTION

Figure 1:
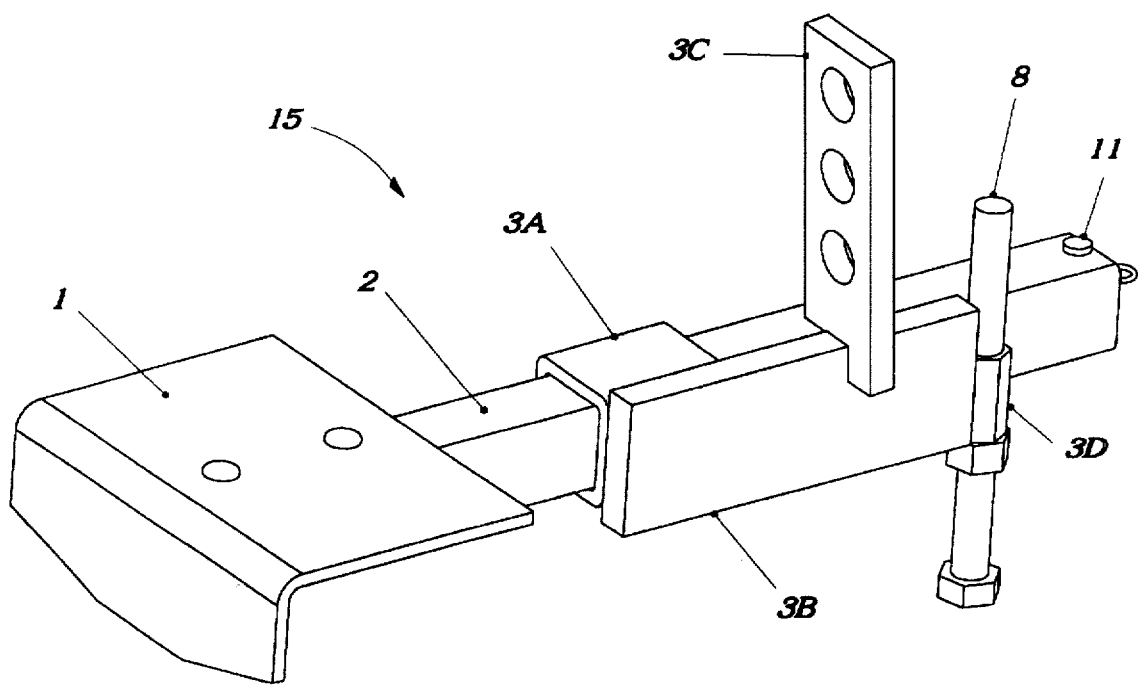
FIG. 1 is a perspective view illustration one embodiment of pull out step system of the invention.
Figure 2:
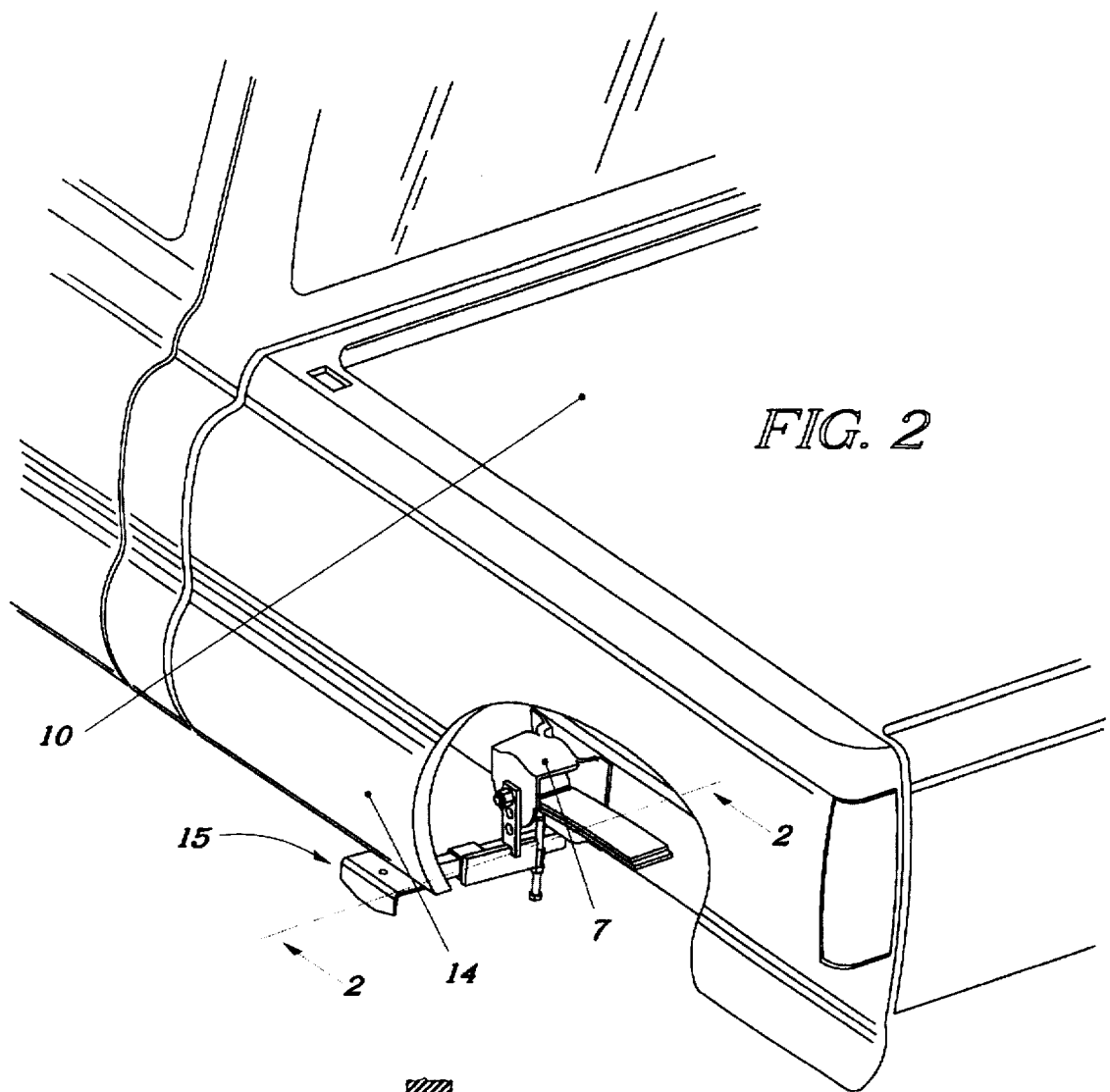
FIG. 2 is a perspective view of a truck incorporating an embodiment of the pull out step system apparatus of the present invention.
Figure 3:
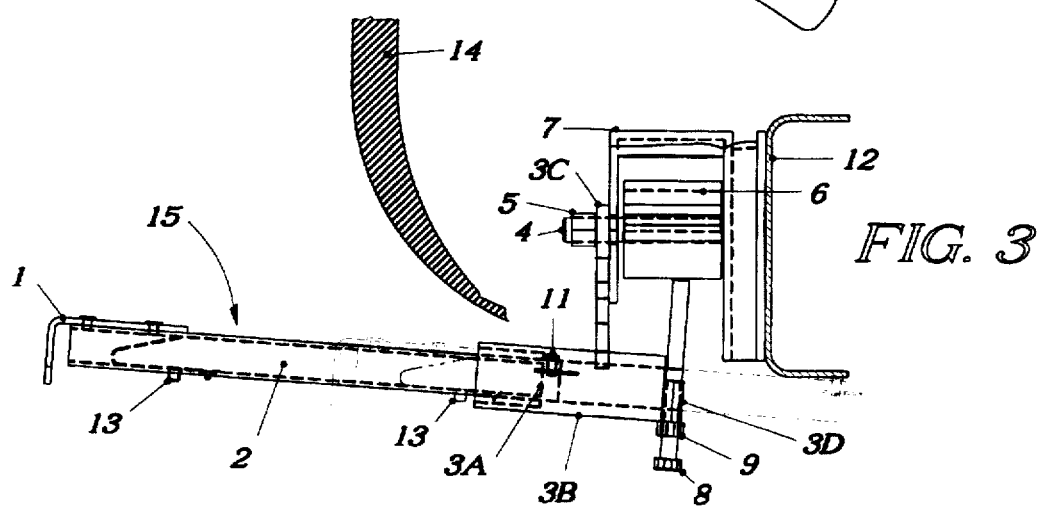
FIG. 3 is an enlarged vertical sectional view taken along the line 2—2 of FIG. 2.

Referring To FIG. 1, 2 and 3 the pull out step system invention, generally, a step device 15 disposed beneath the level of the truck bed 14. Stationary mounting bracket 3A, 3B, 3C and 3D being made of one piece is supported by spring hanger bolt 4 and secured by spring hanger bolt nut 5 and further supported by spring hanger 7, and spring hanger is supported by truck frame 12. Stationary mounting bracket is also supported by adjustable wedge bolt 8, which is wedge against spring end 6. Once adjustable wedge bolt 8 is in place lock nut 9 is screwed upward until tight against bottom of stationary mounting bracket 3D. Locking adjustable wedge bolt 8 into a stationary state.

When the step device 15 is in a closed position it is secured by a push button latch 13. When the step device is in a closed position it is under truck bed 14. When the step device is in a out position it limited by it's out travel by a stop 11. When in an out position user can use the step 1 to step up providing access to truck bed area 10. When user is finished user pushes step 1 which is comprised of a telescoping shaft 2 and push button latch 13 back into a closed position which is illustrated best in FIG. 3 in which the dotted line of the step 1 and telescoping shaft 2 represent a closed position. Telescoping shaft 2 telescopes through stationary shaft support 3A both being made of square tubing. Stationary shaft support 3A is larger allowing telescoping shaft 2 which is smaller to slide inward and outward.

Various modifications and changes may be made with regard to the foregoing detailed description without departing from the spirit of the invention.

I claim:

1. A pull out step system for a passenger pickup truck comprising:
   a. a passenger pickup truck having an unmodified axle spring hanger; and
   b. a universal mounting bracket mounted to said unmodified axle spring hanger; and
   c. said universal mounting bracket also having a pull out step horizontally and extensibly attached thereto; and
   d. said pull out step comprising a step portion fixedly attached to a telescoping member, said telescoping member partially containing a push button latch and a travel stop to define a plurality of travel limit positions of said step.

* * * * *